United States Patent [19]

Sumiya et al.

[11] Patent Number: 4,509,391
[45] Date of Patent: Apr. 9, 1985

[54] HYDRAULIC PRESSURE REGULATING SYSTEM FOR A VEHICLE AUTOMATIC TRANSMISSION

[75] Inventors: Koji Sumiya; Kojiro Kuramochi, both of Aichi, Japan

[73] Assignees: Aisin Warner Kabushiki Kaisha, Anjo; Toyota Jidosha Kogyo Kabushiki Kaisha, Toyota, both of Japan

[21] Appl. No.: 322,611

[22] Filed: Nov. 18, 1981

[30] Foreign Application Priority Data

Nov. 23, 1980 [JP] Japan .................. 55-167991

[51] Int. Cl.³ ............................................ B60K 41/10
[52] U.S. Cl. ...................................... 74/869; 74/869; 74/863
[58] Field of Search .................. 74/862, 863, 865, 867, 74/868, 869

[56] References Cited

U.S. PATENT DOCUMENTS

| | | | |
|---|---|---|---|
| 3,593,598 | 7/1971 | Winn et al. | 74/869 X |
| 3,613,484 | 10/1971 | Pierce et al. | 74/869 |
| 3,706,240 | 12/1972 | Borneman et al. | 74/869 |
| 4,331,046 | 5/1982 | Leonard et al. | 74/869 X |
| 4,346,626 | 8/1982 | Kawamoto | 74/867 X |
| 4,347,764 | 9/1982 | Lauven | 74/869 X |
| 4,347,765 | 9/1982 | Leonard et al. | 74/869 |

Primary Examiner—Allan D. Herrmann
Assistant Examiner—Joseph M. Rolnicki
Attorney, Agent, or Firm—Blum Kaplan Friedman Silberman and Beran

[57] ABSTRACT

In a hydraulic control system for an automatic transmission for vehicles having a pump being driven by the engine of the vehicle for generating a pressure of pressurized fluid in the hydraulic control system, and a pressure regulator valve for regulating the pressure of pressurized fluid supplied from the pump in keeping with an input signal pressure varying in accordance with the cruising condition of the vehicle, a pressure relief valve is provided in the input fluid passage of the regulator valve for relieving the pressure when the input signal pressure exceeds a predetermined level.

4 Claims, 2 Drawing Figures

HYDRAULIC PRESSURE REGULATING SYSTEM FOR A VEHICLE AUTOMATIC TRANSMISSION

BACKGROUND OF THE INVENTION

This invention relates generally to a vehicle automatic transmission and more particularly to a hydraulic pressure regulating system for a vehicle automatic transmission which prevents damage due to high internal fluid pressures. The line pressure applied to the hydraulic control system of an automatic transmission mounted on a vehicle is generated by an oil pump driven by the engine of the vehicle. The pressure of the fluid discharged from the oil pump is regulated to a line pressure by a pressure regulator valve. The line pressure is regulated to a level commensurate with the level of torque to be transmitted so as to reduce the power consumed by the oil pump. Conventionally, the pressure of the fluid discharged from the oil pump becomes excessively high when the engine operates at a high revolving rate during a high speed cruising state of the vehicle. In order to regulate this line pressure by means of a pressure regulator valve, pressure signals are provided to the pressure regulator valve to control the rate of draining the pressurized fluid supplied by the oil pump. These pressure signals may be, for example, the governor pressure, throttle pressure and line pressure which vary according to the running condition of the vehicle, such as transmitted torque. A modulator valve is provided in the input oil passage to the pressure regulator valve to control the input oil pressure when necessary.

In a hydraulic control circuit employing an oil pressure (line pressure) regulating device of the type as described above, the line pressure is liable to rise excessively and cause problems such as damage to sealing members of the automatic transmission when the modulator valve malfunctions, for example, due to a sticking valve. In order to prevent such an excessive increase in the line pressure, a conventional pressure regulating device comprises a relief valve of a large flow capacity in the output passage of the device. Provision of such a relief valve of a large capacity disadvantageously affects efforts to design a compact hydraulic control circuit.

What is needed is a hydraulic pressure regulating system for a vehicle automatic transmission which is compact and provides relief protection from excessively high oil pressures within the transmission and regulating system.

SUMMARY OF THE INVENTION

Generally speaking, in accordance with the invention, a hydraulic pressure regulating system for a vehicle automatic transmission especially suitable for compact design and for protection of the automatic transmission is provided. A hydraulic pressure regulating system for a vehicle automatic transmission has a pump driven by the engine of the vehicle for generating a pressurized fluid in the hydraulic control system. The hydraulic pressure regulating system also includes a pressure regulator valve for regulating the pressure of fluid supplied from the pump in accordance with an input signal pressure in the input fluid passage of the pressure regulator valve, the input signal pressure varying in accordance with the cruising condition of the vehicle. A pressure relief valve is provided within the input fluid passage of the pressure regulator valve for relieving the pressure when the input signal pressure exceeds a preselected level.

Accordingly, it is an object of this invention to provide an improved hydraulic pressure regulating system for a vehicle automatic transmission which prevents an excessive increase in the line pressure by pressure relief when an input signal pressure exceeds a predetermined level.

Another object of this invention is to provide an improved hydraulic pressure regulating system for a vehicle automatic transmission having a pressure regulator valve with a small capacity valve on the inlet side to the pressure regulator valve.

A further object of this invention is to provide an improved hydraulic pressure regulating system for a vehicle automatic transmission providing internal pressure relief for a hydraulic control system and having a small size.

Still other objects and advantages of the invention will in part be obvious and will in part be apparent from the specification.

The invention accordingly comprises the features of construction, combination of elements and arrangement of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENTS

A hydraulic pressure regulating system for a vehicle automatic transmission in accordance with the invention is described hereinafter with reference to the attached drawings.

Figure 1:
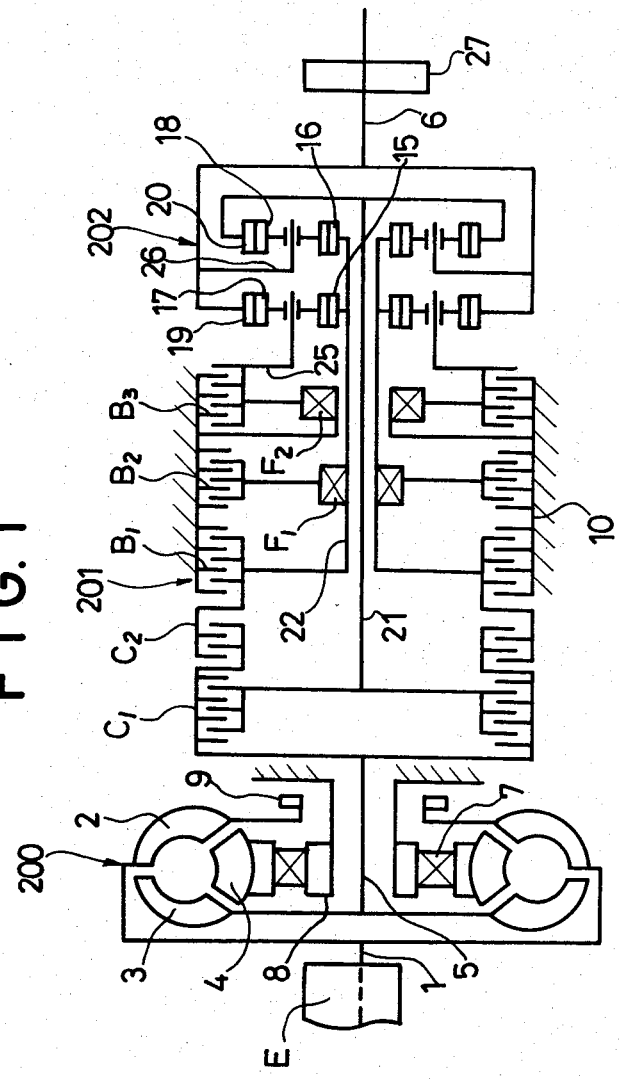
FIG. 1 is a diagramatic illustration of a vehicle automatic transmission.

An automatic transmission having a three forward speed and one reverse speed gear transmission is shown in FIG. 1. This automatic transmission is of a known type comprising a hydraulic torque converter 200 and a planetary gear transmission 201. The hydraulic torque converter 200 is provided with a pump impeller 2, a turbine 3 and a stator 4 mounted on a fixed shaft 8 by means of a one-way clutch 7. Power is transmitted from an output shaft 1 of an engine E to an input shaft 5 of the planetary gear transmission 201. The input shaft 5 also functions as an output shaft of the torque converter 200. The power is further transmitted to an output shaft 6 through the intermediary of the planetary gear transmission 201. An oil pump 9 is fixed on the output shaft 1 and a governor valve 27 is fixed on the output shaft 6.

The planetary gear transmission 201 is controlled by a hydraulic control system (FIG. 2) and described hereinafter. The planetary gear transmission 201 is comprised of various frictional engagement elements and a two-stage planetary gear train 202. The frictional engagement elements include clutches $C_1$ and $C_2$, brakes $B_1, B_2$ and $B_3$, and one-way clutches $F_1$ and $F_2$. These elements are adapted to selectively fix, engage or disengage with component parts of the planetary gear transmission, with the input shaft 5, or with the transmission case 10.

The two-stage planetary gear train 202 is comprised of: a sun gear shaft 22 adapted to be connected to the input shaft 5 through the clutch $C_2$, connected directly to the transmission case 10 through the brake $B_1$, or connected to the transmission casing 10 through the one-way clutch $F_1$ and the brake $B_2$. The planetary gear train 202 also comprises front and rear sun gears 15,16 mounted on the sun gear shaft 22, a front ring gear 19 and a rear carrier 26, each mounted on the output shaft 6, and a rear ring gear 20 mounted on an intermediate shaft 21 which is connected to the output shaft 5 through the clutch $C_1$. The planetary gear train 202 also comprises a front carrier 25 engaged with the transmission casing through the brake $B_3$ and the one-way clutch $F_2$, a front planetary pinion 17 rotatably mounted on the carrier 25 and engaged with both the sun gear 15 and the ring gear 19, and a rear planetary pinion 18 rotatably mounted on the carrier 26 and engaged with both the sun gear 16 and the ring gear 20.

The epicyclic transmission 201 is capable of automatic speed changes, that is, three forward speeds and additionally one reverse and manual speed change by means of a manual speed selector valve as shown in Table 1.

TABLE 1

| Gear shift position | | Clutches and brakes | | | | | | |
|---|---|---|---|---|---|---|---|---|
| | | $C_1$ | $C_2$ | $B_1$ | $B_2$ | $B_3$ | $F_1$ | $F_2$ |
| Reverse | R range | — | o | — | — | o | — | — |
| Forward | | | | | | | | |
| First speed | D.2 range | o | — | — | — | — | — | o |
| First speed | L range | o | — | — | — | Δ | — | o |
| Second speed | D range | o | — | — | o | — | o | — |
| Second speed | 2 range | o | — | Δ | o | — | o | — |
| Third speed | D range | o | o | — | o | — | — | — |

In the Table, the circle symbol (o) represents an engaged or locked condition of a one-way clutch. The triangular symbol (Δ) represents an engagement of brakes upon engine braking. The dash symbol (—) represents a released condition of a clutch or brake or a non-locked condition of a one-way clutch.

Figure 2:
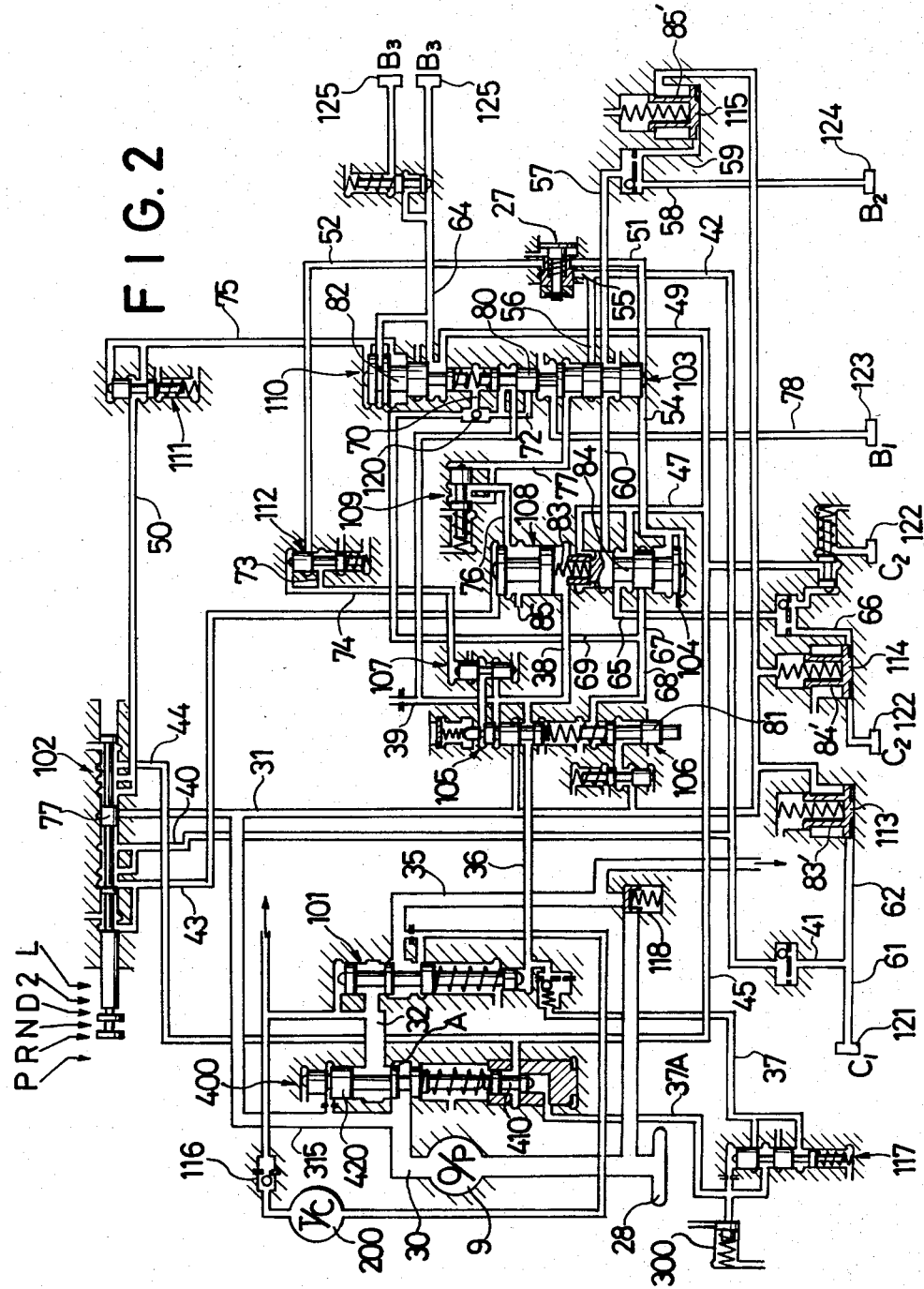
FIG. 2 is an oil/hydraulic circuit diagram of a hydraulic pressure regulating system for a vehicle automatic transmission including a hydraulic control system in accordance with the invention.

The hydraulic control system shown in FIG. 2 comprises an oil reservoir 28, the oil pump 9 (FIG. 1) driven by the engine, a pressure regulator valve 400, a second pressure regulator valve 101, a manual speed selector valve 102, a 1-2 shift valve 103, a 2-3 shift valve 104, a throttle valve 105, a kickdown valve 106, a cut-back valve 107, the governor 27, an intermediate coast shift valve 108, an intermediate coast modulator valve 109, a low coast shift valve 110, a low coast modulator valve 111, and a governor modulator valve 112. The hydraulic control system also comprises an accumulator 113 for the clutch $C_1$, an accumulator 114 for the clutch $C_2$, an accumulator 115 for the brake $B_2$, check valves 116,120, a throttle modulator valve 117, a cooler bypass valve 118, a hydraulic servo 121 for actuation of the clutch $C_1$, a hydraulic servo 122 for actuating the clutch $C_2$, an oil hydraulic cylinder 123 for actuating the brake $B_1$, a hydraulic servo 124 for actuating the brake $B_2$, a hydraulic servo 125 for actuating the brake $B_3$, and a pressure relief valve 300 which is the substance of the present invention. Oil passages connect the valves and servo motors, etc.

In the above-mentioned hydraulic control system, the hydraulic pressure regulating system of the invention is comprised of a regulator valve 400 to which pressurized oil, discharged from the oil pump 9, is supplied via the oil passage 30. The line pressure is also applied to the pressure regulator valve 400 via the manual speed selector valve 102 and an oil passage 44. Also input to the pressure regulator valve 400 through an oil passage 37A is the output pressure of the throttle modulator valve 117 (throttle modulator pressure), which regulates the output pressure of the throttle valve 105 (throttle pressure) applied by way of an oil passage 37. The pressure relief valve 300 is interposed in the input oil passage 37A by which the throttle modulator pressure is applied to the regulator valve 400 as stated.

The pressure regulator valve 400 includes a regulator plunger 410 which is actuated by the throttle modulator pressure and the line pressure. The pressure regulator valve 400 also includes a spool 420 disposed in alignment with the regulator plunger 410 and adapted to be actuated by the regulator plunger 410 to vary the opening area of an annular gap A formed between the spool 420 and the valve wall.

The line pressure is regulated by draining through the annular gap A, a portion of the pressurized oil which is discharged from the oil pump 9 and supplied to the regulator valve 400 via the oil passage 30. The oil at the regulated line pressure is applied to the components of the hydraulic control system via the oil passage 31. The pressure relief valve 300 relieves the pressure in the oil passage 37A when an excessively high oil pressure is applied to the oil passage 37A. Such an excessively high pressure can result from some accident, such as a sticking valve in the throttle modulator valve. The pressure relief valve 300 prevents oil pressure above a predetermined level from acting on the regulator plunger 410.

In summary, it should be noted that the oil pressure regulating system, in accordance with the invention comprises a pressure relief valve 300 positioned in the input oil passage 37A through which a signal pressure is applied to the pressure regulator valve 400. The pressure relief valve 300 is adapted to prevent an excessive rise in the input signal pressure, namely, the throttle pressure or the pressure of a throttle modulator valve, so that an excessive increase in the output pressure of the oil pump 9 is prevented. Because of the location in the circuit of the pressure relief valve 300, only a pressure relief valve of small capacity is required as compared to a conventional oil pressure regulating system wherein a pressure relief valve is used in the output oil passage 30 of the oil pump 9 to prevent an excessive increase in the output pressure of the pump 9. Furthermore, use of a pressure relief valve of a small capacity reduces the load on the pump 9 thereby facilitating an enhanced design of the pump.

Line pressure in the oil passage 31 is supplied to the manual speed selector valve 102, the kickdown valve 106, the throttle valve 105, and the accumulators 113,114,115. Oil or throttle pressure, regulated at the throttle valve 105, is introduced to the second pressure regulator valve 101 by way of an oil passage 36 and further to the throttle modulator valve 117 by way of an oil passage 37. Also, the oil pressure is introduced to the 2-3 shift valve 104 by way of an oil passage 38 and to the 1-2 shift valve 103 via the oil passage 39.

Line pressure introduced to the kickdown valve 106 through the oil passage 31 is applied to the 2-3 shift valve 104 by way of oil passages 67,68, and is applied via an oil passage 69 to the check valve 120. The valve 120 communicates with the 1–2 shift valve 103 through oil passages 70,72.

The manual speed selector valve 102 is used to select respective gear shift positions for the vehicle automatic transmission. By means of this manual speed selector valve 102, oil pressure, that is, line pressure, regulated at the pressure regulator valve 400 is supplied to the hydraulic servo 121 associated with the friction clutch $C_1$ by way of the oil passages 40,41,61. Line pressure from the manual speed selector valve 102 is also supplied to the accumulator 113 by way of the oil passages 40,41,62. Pressure from the speed selector valve 102 is also applied to the governor valve 27 by way of the oil passages 40,42,55, to the 1–2 shift valve 103 by way of the oil passages 40,42,56; to the 2–3 shift valve 104 by way of the oil passage 43; to the pressure regulator valve 400 by way of the oil passage 44; to the 2–3 shift valve 104 by way of the oil passages 44,45,47; to the low coast shift valve 110 via the oil passages 44,45,49; and further to the low modulator valve 111 by way of an oil passage 50. A cooler bypass valve 118, provided in the oil passage 35 controls the pressure of the oil supplied to a cooler (not shown) at a lower pressure.

Further, oil regulated to a pressure commensurate with the rotational speed of the output shaft 6 by the governor valve 27, that is, oil at governor pressure, is supplied to the governor modulator valve 112 through an oil passage 52; to the 1–2 shift valve 103 by way of oil passage 51; and to the 2–3 shift valve 104 by way of the oil passages 51,54.

Line pressure supplied to the 1–2 shift valve 103 through the oil passage 56 is supplied to the hydraulic servo 124 through oil passages 57,58 to the accumulator 115 through the oil passage 57,59, and also to the 2–3 shift valve 104 through an oil passage 60. Line pressure fed from the oil passage 45 to the 1–2 shift valve 103 is supplied to the hydraulic servo 125 for the friction brake $B_3$ by way of an oil passage 64. Line pressure supplied to the 2–3 shift valve 104 through the oil passage 47 is introduced to the accumulator 114 and to the hydraulic servo 122 of the friction clutch $C_2$ by way of an oil passage 65.

The governor pressure supplied to the governor modulator valve 112 through the oil passage 52 is pressure regulated and is introduced to the cut-back valve 107 by way of oil passages 73,74. Line pressure supplied to the low modulator valve 111 through the oil passage 50 is introduced to the low coast shift valve 110 through an oil passage 75 after pressure regulation by the low modulator valve 111.

Line pressure, supplied to the intermediate shift valve 108 through the oil passage 43, is further supplied to the intermediate modulator valve 109 by way of an oil passage 76, and is introduced into the 1–2 shift valve 103 by way of an oil passage 77 after pressure regulation by the modulator valve 109. Thereafter, the pressure is supplied to the hydraulic servo 123 of the friction brake $B_1$ through an oil passage 78.

The manual speed selector valve 102 causes a valve body 77 to slide with the shift operation of an external lever or the like, at the vehicle driver's seat, and selectively distributes the line pressure within the oil passage 31 to each oil passage in accordance with the gear shift position of the lever, as shown in Table 2.

TABLE 2

| Gear Shift | P | R | N | D | 2 | L |
|---|---|---|---|---|---|---|
| Oil Passage 40 | — | — | — | o | o | o |

TABLE 2-continued

| Gear Shift | P | R | N | D | 2 | L |
|---|---|---|---|---|---|---|
| Oil Passage 43 | — | — | — | — | o | o |
| Oil Passage 44 | — | o | — | — | — | — |
| Oil Passage 50 | o | o | — | — | — | o |

In Table 2, the circular symbol (o) represents the presence of the line pressure in the associated oil passage at each of the gear shift positions. The dash symbol (—) represents the absence of the line pressure in the associated oil passage. Symbols P,R,N,D,2 and L represent gear shift positions as follows:

P: Park. When parking, a parking lock pawl (not shown) meshes with the outer periphery of the front ring gear 19 whereby the output shaft 6 is locked in position.

R: Reverse. The vehicle moves in the reverse direction.

N: Neutral. Oil pressure is not supplied to any passage from the manual speed selector valve 102, and engine power is not transmitted to the output shaft 6.

D: Forward. In this embodiment, an automatic three-forward speed transmission is operational, wherein shifting to a higher speed gear or shifting down to a lower speed gear is automatically accomplished.

2: Shifting up to the second speed or shifting down to the first speed is automatically accomplished.

L: Low. A fixed position is maintained at the first speed.

Each valve is constructed as described hereinafter in order to smoothly perform engagement of the friction elements, as shown in Table 1, in each of the shift positions described above for the manual speed selecting valve 102.

The second pressure regulating valve 101 regulates the oil pressure for the torque converter 200, the lubricant oil pressure and cooler pressure to a pressure level commensurate with the vehicle speed and the opening of the carburetor throttle. The governor valve 27 generates an oil pressure commensurate with the rotational speed of the output shaft 6 (governor pressure). The throttle valve 105 is adapted to generate the throttle pressure commensurate with the opening of the carburetor throttle, that is, commensurate with the output of the engine.

Oil pressure commensurate with the throttle opening (throttle pressure) is fed to the pressure regulator valve 400 and the second pressure regulator valve 101 so as to regulate the line pressure. This pressure is also fed to the 1–2 shift valve 103 and 2–3 shift valve 104 for acting against the governor pressure.

The 1–2 shift valve 103 automatically controls changeover between the first and second speed depending on a balance in the relationship between the governor pressure and the throttle pressure. Under a condition where the governor pressure supplied from the oil passage 51 is high, and the throttle pressure as applied from the oil passage 39 is low, a valve body 80 of the 1–2 shift valve 103 moves to an upper position urged by the higher level of the governor pressure. In this conditiion, the oil passages 56,57 communicate with each other whereby the line pressure is supplied to the hydraulic servo 124 associated with the friction brake $B_2$ by way of the oil passages 57,58. The brake $B_2$ engages to establish the second speed (Table 1).

When the govenor pressure is low and the throttle pressure is high, the valve body 80 in the 1–2 shift valve 103 moves to a lower position as a result of the throttle pressure, and blocks the connection between the oil passages 56,57 to achieve the first speed.

The kickdown valve 106 has its valve body 81 move upwardly rapidly when the carburetor valve is opened almost to the maximum. Then, the oil passages 31,68 connect with each other permitting the oil pressure to act on the 2-3 shift valve 104 through the oil passage 67. This position of the valve body also permits the oil pressure to act on the 1-2 shift valve 103 by way of a changeover valve 120 and the oil passage 70.

When in the Low (L) range, the low modulator valve 111 regulates the line pressure to a low level. This occurs when the line pressure acts on the low modulator valve 111 through the oil passage 50, and the regulated oil pressure acts on the low coast shift valve 110 through the oil passage 75. Thereby, the low coast shift valve 110 moves downwardly to connect oil passages 75,64 together. The low oil pressure acts on the hydraulic servo 125 of the brake $B_3$ to maintain the first speed.

When in the reverse (R) range, the low cost shift valve 110 causes a valve body 82 within the valve to move upwardly against the lower oil pressure for the low modulator valve 111 when the line pressure acts on the low coast shift valve 110 through the oil passage 49. Thereby, the oil passages 49,64 connect with each other, and line pressure is introduced into the hydraulic servo 125 associated with the brake $B_3$ to fix the gear transmission at the reverse gear condition.

The governor modulator valve 112 regulates the governor pressure from the oil passage 52 to a preselected value to thereby permit the oil to act on the cutback valve 107 through the oil passages 73,74. The cutback valve 107 actuates in response to the oil pressure in the oil passage 74 and the throttle pressure, thereby regulating the cutback oil pressure acting on the throttle valve 105. By this reduced oil pressure acting on the throttle valve 105, the throttle pressure is lowered, whereby an unnecessary loss of power at the oil pump 9 is prevented.

The accumulators 113,114,115 are interposed in the oil passages 62,65,59 respectively, and relieve the shock when the friction clutches $C_1,C_2$ in the friction brake $B_2$ are engaged herein. The oil passage 59 connects to an oil passage 58.

An area difference exists between the acting side and the back pressure side of the accumulator pistons 83',84',85', the area of the acting sides being larger. The line pressure always acts on the back pressure side through the oil passage 31 and the pistons 83',84',85' are pushed downwardly. When the line pressure acts on the acting side of the accumulator pistons through the oil passages 62,65 or through the oil passage 59, the pistons 83',84',85', respectively, are slowly pushed upwardly so as to relieve the shock which occurs upon an engagement of clutches and brakes.

The 2-3 valve 104 performs the changeover between second speed and third speed. A valve body 84 is controlled in position by the governor pressure supplied through the oil passage 54, by the throttle pressure supplied through the oil passage 38, the throttle pressure opposing the governor pressure, and by a spring 83. When the governor pressure is high, the valve body 84 assumes an upper position operating against the throttle pressure and the force of the spring 83. Thereby, the oil passages 60,65 communicate with each other, supplying the line pressure to the hydraulic servo 122 associated with the friction clutch $C_2$ through the oil passage 65. Thereby, the third speed range is established.

During this time, the connection between the oil passage 76 and the oil passage 43 is cut-off in the intermediate shift valve 108 and the oil passage 76 exhausts through an exhaust oil port 85. Thereby, the line pressure which had been fed to the hydraulic servo 123 of the friction brake $B_1$ is relieved.

When the governor pressure is low, the valve body 84 is pushed back, that is, downwardly, by the throttle oil pressure and the force of the spring 83. The oil hydraulic circuit to the hydraulic servo 123 of the friction brake $B_1$ is cut-off to thereby establish a second speed.

For kickdown, because the oil pressure to the oil passage 67 acts on the valve body 84 to push the valve body 84 downwardly, down shifting to the second speed is performed at a higher vehicle speed than the case described above.

As previously stated, the hydraulic pressure regulating system for a vehicle automatic transmission in accordance with this invention makes possible the prevention of an excessive increase in the line pressure in the hydraulic control system of the automatic transmission for vehicles. The hydraulic pressure regulating system of this invention also facilitates the design of a compact hydraulic control system circuit, because the pressure relief valve of a small capacity is provided within the input oil passage which communicates with the pressure regulator valve and prevents an excessive increase in the pressure of the input to the pressure regulator valve. Conventionally, a larger capacity valve has been used downstream of the pressure regulator valve.

It will thus be seen that the objects set forth above, among those made apparent from the the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A hydraulic pressure regulating system for use in a automatic transmission associated with an engine having an intake throttle opening, said automatic transmission having a fluid coupling type torque converter, a gear system with a number of friction elements to establish two or more speed ratios, and a hydraulic control system comprising:

a fluid reservoir;

a pump for pumping fluid from said reservoir and for supplying pressurized fluid to said hydraulic control system;

a first pressure regulator valve for regulating the discharge pressure of said pressurized fluid from said pump and supplying said pressure regulated fluid as a controlled line pressure to said hydraulic control system;

a throttle valve for generating a throttle pressure, said throttle pressure varying in accordance with the intake throttle opening of said engine;

a second pressure regulator valve for regulating the fluid pressure of a portion of said fluid supplied to said hydraulic control system, said second pressure regulator valve being adapted to supply said portion of fluid to said torque converter at a regulated pressure commensurate with both the throttle pressure and the line pressure;

passage means for supplying said throttle pressure to the second pressure regulator valve and an inlet of said first pressure regulator valve, said first pressure regulator valve being adapted to vary said line pressure commensurately with said throttle pressure;

a pressure relief valve provided in said passage means for relieving the fluid pressure in said passage means when the fluid pressure in said passage means is in excess of a preselected level; and a throttle modulator valve provided in said passage means, said throttle modulator valve being upstream of said pressure relief valve and downstream from said second pressure regulator valve.

2. A hydraulic pressure regulating system as claimed in claim 1, and further comprising a throttle modulator valve in said passage means, said throttle modulator valve being downstream from said throttle valve and upstream of said first pressure regulator valve.

3. A hydraulic pressure regulating system as claimed in claim 1, wherein said first pressure regulator valve includes a regulator plunger and said passage means supplies said throttle pressure to one end of said regulator plunger.

4. A hydraulic pressure regulating system as claimed in claim 1, wherein said second pressure regulator valve includes a regulator plunger, said passage means supplying said throttle pressure to one end of said second regulator plunger.

* * * * *